United States Patent
Bergami (10) Patent No.: US 11,143,114 B2
(45) Date of Patent: Oct. 12, 2021

(54) CONTROL METHOD FOR CONTROLLING AN AIR INTAKE SYSTEM WHICH SUPPLIES AIR TO AN ENGINE OF A VEHICLE

(71) Applicant: BMC S.r.l., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 217 days.

(21) Appl. No.: 16/162,682

(22) Filed: Oct. 17, 2018

(65) Prior Publication Data
US 2019/0112981 A1   Apr. 18, 2019

(30) Foreign Application Priority Data
Oct. 18, 2017   (IT) .................. 102017000117802

(51) Int. Cl.
*F02C 9/52* (2006.01)
*F02C 7/047* (2006.01)
(Continued)

(52) U.S. Cl.
CPC ............ *F02C 9/52* (2013.01); *B01D 46/4263* (2013.01); *B01D 46/446* (2013.01); *B01D 46/448* (2013.01); *B60H 1/3421* (2013.01); *B64D 33/02* (2013.01); *F02C 7/047* (2013.01); *F02C 7/052* (2013.01); *F02C 9/18* (2013.01); *F02M 31/13* (2013.01); *F02M 35/042* (2013.01); *F02M 35/082* (2013.01); *F02M 35/16* (2013.01); *B01D 46/521* (2013.01); *B64C 2201/024* (2013.01);
(Continued)

(58) Field of Classification Search
CPC ...... F02M 35/00; F02M 35/042; F02C 7/052; F02C 7/055; F02C 9/18; F02C 9/52; F05D 2270/301; F05D 2270/3011; F05D 2270/3013; F05D 2270/3015; F05D 2270/312; F05D 2270/702; B64D 2033/0233; B60H 1/3421
USPC ................ 60/39.092, 39.093; 55/306, 385.3; 123/198 E
See application file for complete search history.

(56) References Cited

U.S. PATENT DOCUMENTS 4,482,461 A * 11/1984 Hindman ............. B01D 29/114
 210/741
2007/0056272 A1 * 3/2007 Dollmeyer ............ F01N 11/002
 60/297
(Continued)

FOREIGN PATENT DOCUMENTS

WO    WO 2007/016800    2/2007
WO    WO 2017/115331    7/2017

*Primary Examiner* — Todd E Manahan
*Assistant Examiner* — David P. Olynick
(74) *Attorney, Agent, or Firm* — Leason Ellis LLP (57) ABSTRACT

A control method for controlling an air intake system for an engine of a vehicle; the intake system has a main air intake coupled to an air filter provided with a heating device. The control method comprises the steps of: determining a pressure difference between upstream and downstream of the air filter; determining a variation speed of the pressure difference between upstream and downstream of the air filter by calculating the first derivative in time of the pressure difference between upstream and downstream of the air filter; and turning on and/or turning off the heating device based on the variation speed of the pressure difference between upstream and downstream of the air filter.

19 Claims, 5 Drawing Sheets

(51) Int. Cl.
  *B01D 46/42* (2006.01)
  *B01D 46/44* (2006.01)
  *B60H 1/34* (2006.01)
  *F02M 31/13* (2006.01)
  *F02C 7/052* (2006.01)
  *F02M 35/08* (2006.01)
  *F02M 35/16* (2006.01)
  *F02M 35/04* (2006.01)
  *B64D 33/02* (2006.01)
  *F02C 9/18* (2006.01)
  *B01D 46/52* (2006.01)

(52) U.S. Cl.
  CPC ............... *B64D 2033/0233* (2013.01); *B64D 2033/0246* (2013.01); *B64D 2033/0253* (2013.01); *F05D 2220/329* (2013.01); *F05D 2270/3015* (2013.01); *F05D 2270/312* (2013.01); *F05D 2270/702* (2013.01)

(56) References Cited

U.S. PATENT DOCUMENTS

| | | | |
|---|---|---|---|
| 2009/0007528 A1* | 1/2009 | Wilson | B01D 46/10 55/306 |
| 2009/0139200 A1* | 6/2009 | Colaprisco | B01D 46/12 60/39.092 |
| 2010/0229718 A1 | 9/2010 | Yacoub | |
| 2014/0077039 A1* | 3/2014 | Scimone | B64D 15/12 244/23 B |
| 2016/0131012 A1* | 5/2016 | Prospero | F02D 41/1448 60/295 |
| 2017/0211452 A1* | 7/2017 | Imai | F01N 9/002 |

\* cited by examiner

CONTROL METHOD FOR CONTROLLING AN AIR INTAKE SYSTEM WHICH SUPPLIES AIR TO AN ENGINE OF A VEHICLE

CROSS-REFERENCE TO RELATED APPLICATIONS

This application claims priority from Italian Patent Application No. 102017000117802 filed on Oct. 18, 2017, the disclosure of which is incorporated by reference.

FIELD OF THE ART

The present invention relates to a control method for controlling an air intake system which supplies air to an engine of a vehicle.

The present invention finds advantageous use on an aircraft (or a man-made machine, which supports itself and can move in the air allowing the transport of people or objects within the earth's atmosphere) and in particular, on a helicopter, to which the following discussion will make explicit reference without loss of generality.

PRIOR ART

A modern helicopter is generally provided with at least one turbine engine, which drives a system of blades, which allow the helicopter itself to lift up and lower vertically, stay still in flight, move sideways, backwards or forwards. The turbine engine has an air intake at the front, through which the turbine engine sucks in the outside air needed for the operation thereof (or the outside air containing the oxygen needed for combustion).

Generally, the air intake can comprise a metal grid with a relatively wide mesh (whose size is in the order of one or two centimetres), which serves to prevent the entry of birds. An air filter, having the function of filtering the air sucked in to trap impurities of small dimensions (dust or similar), which, in the long-term, can cause premature wear of the turbine engine, can be arranged between the air intake and the turbine engine.

The air filter can only be used when the ambient temperature is (appropriately) above zero (on the ground and also at high altitudes), because the filtering material is normally hygroscopic and thus tends to absorb the humidity in the atmosphere: if the temperature falls below zero, the humidity in the filtering material freezes forming ice, which constitutes an impenetrable barrier (more or less widespread) for the inlet of the air (but the same problem would also exist with a non-hygroscopic filtering material because of the surface humidity, which deposits on the outer surfaces of the filtering material or because of snow, which might deposit on the outer surface of the filtering material). Consequently, when the ambient temperature is close to or below zero, the air filter cannot be used (in particular it is bypassed by opening one or more bypass ducts arranged parallel to the air filter). Alternatively, it was proposed to provide the air filter with a heating device, which is adapted to keep the temperature of the filtering material always at a temperature (appropriately) above zero; however, known heating devices are relatively bulky and heavy (a fault, which is particularly disadvantageous on an aircraft) because they comprise directing jets of hot air generated by a compressor towards the air filter.

Patent application WO2017115331A1 describes a vehicle provided with an air filter on suction provided with an electric heating device, which is electrically connected to a group of electrified wires of an external reinforcing network of the air filter, and is adapted to make an electric current circulate through the electrified wires to generate, by Joule effect, heat in the external reinforcing network itself. Patent application WO2017115331A1 describes a capacitive sensor, which is coupled to the air filter and adapted to determine a flow of air, which flows through the air filter, and can be used to command the switching on/switching off of the heating device; or the heating device is switched on when the flow of air, which flows through the air filter is below a first predetermined threshold and is switched off when the flow of air, which flows through the air filter exceeds a second predetermined threshold (the two thresholds do not coincide to have a certain hysteresis, preventing the heating device from being switched on/switched off too frequently). However, it has been observed that the capacitive sensor does not allow the flow of air, flowing through the air filter to be recorded in a very precise manner and above all, it has been observed that the control of the heating device depending on the flow of air, crossing the air filter does not allow optimal (or effective and efficient) control of the air filter because the flow of air, flowing through the air filter undergoes significant variations not only caused by the effect of the presence of ice on the outer surface of the air filter, but also caused by the presence of other impurities (dust, debris, leaves . . . ) and above all, caused by the fluctuations of the mechanical power generated by the engine (in other words, when the engine generates a reduced mechanical power the flow of air flowing through the air filter is also reduced).

It has also been proposed to command the switching on/switching off of the heating device according to the external temperature (recorded by means of a temperature sensor arranged more or less close to the outer surface of the air filter); or the heating device is switched on when the external temperature is below a first predetermined threshold (for example, 1° C.) and is switched off when the external temperature exceeds a second predetermined threshold (for example, 4° C., the two thresholds do not coincide to have a certain hysteresis, which prevents the heating device from being switched on/switched off too frequently). However, it has been observed that this strategy for controlling the heating device is effective (or it prevents ice from forming on the outer surface of the air filter) but inefficient (or results in an excessive consumption of electricity) as it tends to keep the heating device on also when it might not be necessary since a low external temperature is a necessary condition but not sufficient in itself for ice to form on the outer surface of the air filter; in other words, also when the external temperature is below zero degrees centigrade, ice cannot form on the outer surface of the air filter because the external humidity is reduced and/or because the continuous flow of air through the air filter hampers the formation of ice on the outer surface of the air filter itself (or in dynamic conditions it is more difficult for ice to form).

DESCRIPTION OF THE INVENTION

It is an object of the present invention to provide a control method for controlling an air intake system which supplies air to an engine of a vehicle, which control method allows the heating device coupled to the air filter to be used in an effective and efficient manner, which is at the same time both cheap and easy to implement.

A control method for controlling an air intake system which supplies air to an engine of a vehicle is provided according to the present invention, according to what is claimed by the appended claims.

The claims describe preferred embodiments of the present invention, forming an integral part of the present description.

BRIEF DESCRIPTION OF THE DRAWINGS

The present invention will now be described with reference to the appended drawings, which illustrate a non-limiting embodiment thereof, wherein.

PREFERRED EMBODIMENTS OF THE INVENTION

Figure 1:
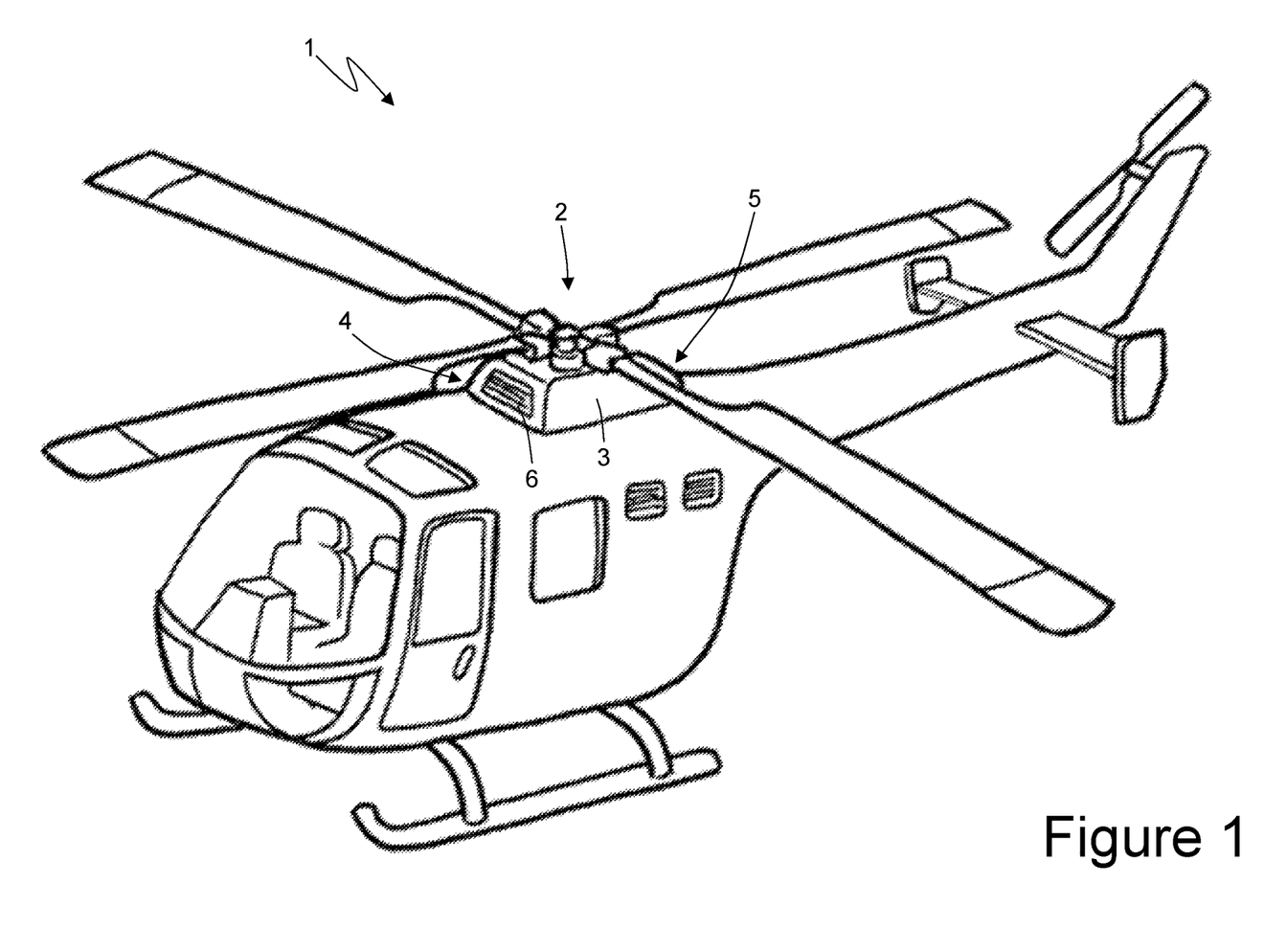
FIG. 1 is schematic and perspective view of a helicopter made according to the present invention.

Number 1 in FIG. 1 indicates, as a whole, a helicopter comprising a turbine engine 2, which drives a system of blades, which allow the helicopter itself to lift up and lower vertically, stay still in flight, move sideways, backwards or forwards.

The turbine engine 2 comprises a tubular housing 3 having a main air intake 4 at the front (through which the turbine engine 2 sucks in the outside air needed for the operation thereof, or the outside air containing the oxygen needed for combustion) and an opening 5 at the back for letting out the air (through which the turbine engine 2 expels the exhaust gases produced by the combustion). A metal grid 6 with a relatively wide mesh (in the order of one or two centimetres), which serves to prevent the entry of birds, is arranged at the main air intake 4.

Figure 2:
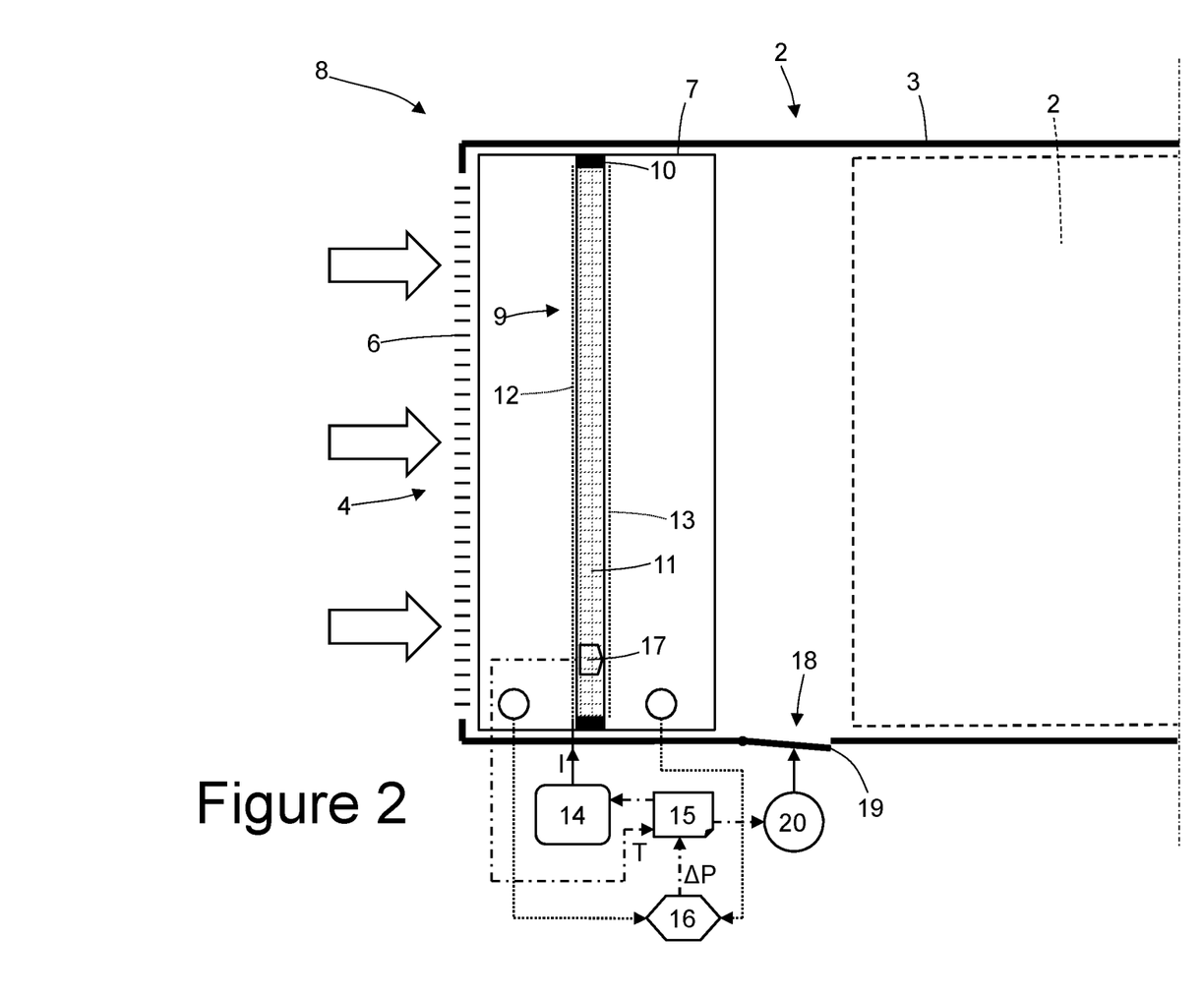
FIG. 2 is a schematic, cross-sectional view of an intake system of an engine of the helicopter in FIG. 1.

According to the illustration in FIG. 2, an air box 7 is obtained in the tubular housing 3, which has a cavity therein with an inlet opening coupled to the main air intake 4 of the tubular housing 3 and an outlet opening coupled to the turbine engine 2; through the air box 7 the fresh air is conveyed towards the moving parts of the turbine engine 2 in which the combustion of the fuel takes place using the air taken in as combustible, or through the air box 7 the fresh air is conveyed towards the combustion chamber of the turbine engine 2. Essentially, the air box 7, together with the initial part of the tubular housing 3, form part of an intake system 8 of the turbine engine 2.

An air filter 9 is arranged inside the cavity of the air box 7, interposed between the inlet opening and the outlet opening, and thus divides the cavity into an inlet chamber, which is arranged upstream of the air filter 9 and communicates with the external environment, and an outlet chamber, which is arranged downstream of the air filter 9 and communicates with the turbine engine 2. The air filter 9 is arranged downstream of the main air intake 4 and has the function of filtering the air sucked in to trap impurities of small dimensions (dust or similar), which, in the long-term, can cause premature wear of the turbine engine 2.

The air filter 9 comprises a perimeter frame 10 (made of aluminium, plastic material or compound material), which supports a panel 11 of pleated filtering material (for example, made of fabric or non-woven fabric of cotton or other fibres enclosed between two layers of thin metal net, which give shape and resistance to the filtering material itself). Furthermore, the air filter 9 comprises a thin pleated outer reinforcing net 12 and a thin pleated inner reinforcing net 13, which rest on opposite surfaces of the panel 11 of filtering material (or enclose between them the panel 11 of filtering material) to give a stable shape and resistance to the panel 11 of filtering material itself. In other words, the panel 11 of filtering material is covered on both sides by the reinforcing nets 12 and 13 (that is, it is contained between the reinforcing nets 12 and 13), which give a stable shape to the panel 11 of filtering material itself. The outer reinforcing net 12 rests on an outer surface of the panel 11 of filtering material through which the air being sucked in enters and crosses the panel 11 of filtering material itself; while, the inner reinforcing net 13 rests on an inner surface of the panel 11 of filtering material opposite the outer surface.

The air filter 9 comprises a heating device 14, which is adapted to heat (when necessary) the panel 11 of filtering material. In particular, the heating device 14 is adapted to make an electric current I circulate through part of the outer reinforcing net 12 to generate heat, by Joule effect, in the outer reinforcing net 12 itself. The heat generated by the outer reinforcing net 12 is transmitted to the panel 11 of filtering material both directly by thermal conduction (because the outer reinforcing net 12 rests on an outer surface of the panel 11 of filtering material), and indirectly by means of the air being sucked in, which is heated when it crosses the outer reinforcing net 12 and subsequently transfers heat to the panel 11 of filtering material as it crosses the panel 11 of filtering material itself.

By way of example, the heating device 14 is made as described in patent application WO2017115331A1 or in patent application IT102016000105840 (incorporated herein by reference).

A control unit 15 is comprised, which drives the heating device 14, or determines when the heating device 14 must be turned on (making the electric current I circulate through part of the outer reinforcing net 12) or when it must be turned off (not making the electric current I circulate through part of the outer reinforcing net 12).

A pressure sensor 16 is comprised, which is adapted to record the differential pressure $\Delta P$ between upstream and downstream of the air filter 9, or the existing pressure difference $\Delta P$ between the air pressure upstream of the air filter 9 (in other words, opposite the outer reinforcing net 12) and the air pressure downstream of the air filter 9 (in other words, opposite the inner reinforcing net 13). In other words, the pressure sensor 16 is adapted to record the drop $\Delta P$ in pressure, which occurs around the air filter 9, or the reduction $\Delta P$ in pressure, which the air taken in undergoes on crossing the air filter 9. The pressure sensor 16 is connected to the control unit 15 to communicate to the same control unit 15 the current value of the differential pressure $\Delta P$ between upstream and downstream of the air filter 9; it is important to note that the pressure sensor 16 can be physically separated from the control unit 15 and thus connected to the control unit 15 by means of a cable or by means of a wireless communication protocol, or the pressure sensor 16 can be physically integrated into a common support, which also houses the control unit 15.

A temperature sensor 17 is comprised, which is adapted to record the temperature T of the air filter 9; according to a preferred embodiment, the temperature sensor 17 is embedded in the panel 11 of filtering material to determine the temperature T of the panel 11 of filtering material of the air filter 9 (alternatively, the temperature sensor 17 could be coupled to other parts of the air filter 9). The temperature sensor 17 is connected to the control unit 15 to communicate to the same control unit 15 the temperature T of the air filter 9; it is important to note that the temperature sensor 17 can by physically separated from the control unit 15 and thus connected to the control unit 15 by means of a cable or by means of a wireless communication protocol, or the temperature sensor 17 can be physically integrated into a common support, which also houses the control unit 15.

According to a preferred embodiment illustrated in FIG. 2, the housing 3 also comprises a bypass air intake 18, which is completely separate and independent from the main air intake 4 (therefore from the air filter 9) and arranged downstream of the air filter 9; the outside air needed to operate the turbine engine 2 can be taken in through the bypass air intake 18 as an alternative to the air intake 4 without crossing the air filter 9. In the illustrated embodiment in the appended figures, the housing 3 comprises a single bypass air intake 18, but according to other embodiments, which are not illustrated and perfectly equivalent, the housing 3 comprises several bypass air intakes 18.

A shutter device 19 is comprised, which is coupled to the bypass air intake 18 and movably mounted to move between a closed position, in which it closes the bypass air intake 18 (to prevent air from entering through the bypass air intake 18), and an open position, in which it leaves the passage free through the bypass air intake 18 (to allow air to enter through the bypass air intake 18). An actuator 20 is also comprised (for example an electric motor), which is controlled by the control unit 15 and moves the shutter device 19 between the closed position and the open position.

When the shutter device 19 is in the closed position, the outside air can only reach the turbine engine 2 by passing through the main air intake 4 and therefore by crossing the air filter 9. Instead, when the shutter device 19 is in the open position, the outside air can reach the turbine engine 2 both by passing through the main air intake 4 and thus by crossing the air filter 9, and by passing through the bypass air intake 18 and thus without crossing the air filter 9 (the bypass air intake 18 being devoid of filtering material constitutes no obstacle for the passage of the air). Clearly, when the shutter device 19 is in the open position, almost all of the air, which reaches the turbine engine 2, passes through the bypass air intake 18 rather than through the main air intake 4, which is engaged by the air filter 9, because passing through the bypass air intake 18 it has reduced pressure drops.

Described below is the working of the heating device 14 coupled to the air filter 9.

The control unit 15 cyclically determines the pressure difference ΔP between upstream and downstream of the air filter 9 through the reading of the pressure sensor 16 and thus cyclically determines the variation speed dΔP/dt of the pressure difference ΔP between upstream and downstream of the air filter 9 by calculating the first derivative in time of the pressure difference ΔP between upstream and downstream of the air filter 9. Therefore, the control unit 15 turns on and turns off the heating device 14 based on the variation speed dΔP/dt of the pressure difference ΔP between upstream and downstream of the air filter 9, or based on how quickly the pressure difference ΔP increases or decreases between upstream and downstream of the air filter 9.

According to a preferred embodiment, the control unit 15 determines the variation speed dΔP/dt of the pressure difference ΔP between upstream and downstream of the air filter 9 by applying a low-step filter (or a filter, which blocks the high frequency variations) at the first derivative in time of the pressure difference ΔP between upstream and downstream of the air filter 9; in this way, the high frequency noise is eliminated, which is amplified by the derivation in time process.

According to a preferred embodiment, the control unit 15 always keeps the heating device 14 switched off until the shutter device 19 of the bypass air intake 18 arranged downstream of the air filter 9 is open; in other words, until the shutter device 19 is open, the heating device 14 is off to prevent electricity from being dissipated uselessly (when the shutter device 19 is open, the main air intake 4 is substantially useless).

The control unit 15 turns on the heating device 14 (only if the shutter device 19 is closed) when the variation speed dΔP/dt of the pressure difference ΔP between upstream and downstream of the air filter 9 is positive, and in absolute value greater than a threshold value TV1; to avoid reacting to sporadic reading errors of the pressure sensor 16, preferably, the control unit 15 turns on the heating device 14 (only if the shutter device 19 is closed) when the variation speed dΔP/dt of the pressure difference ΔP between upstream and downstream of the air filter 9 is positive, and in absolute value permanently greater than the threshold value TV1 for an interval A of time. According to a preferred embodiment, the heating device 14 is turned on at the greatest power possible when the variation speed dΔP/dt of the pressure difference ΔP between upstream and downstream of the air filter 9 is positive, and in absolute value greater than the threshold value TV1.

After turning on the heating device 14 (at the greatest power possible) once the variation speed dΔP/dt of the pressure difference ΔP between upstream and downstream of the air filter 9 is positive, and in absolute value greater than the threshold value TV1, the control unit 15 waits for an interval B of time and then turns off the heating device 14 and opens the shutter device 19 of the bypass air intake 18 arranged downstream of the air filter 9 if, after waiting for the interval B of time, the variation speed dΔP/dt of the pressure difference ΔP between upstream and downstream of the air filter 9 has not become negative for at least a given period of time (or the pressure difference ΔP between upstream and downstream of the air filter 9 has not decreased for at least a given period of time).

After turning on the heating device 14 (at the greatest power possible), once the variation speed dΔP/dt of the pressure difference ΔP between upstream and downstream of the air filter 9 is positive, and in absolute value greater than the threshold value TV1, the control unit 15 waits for the interval B of time and then reduces the power of the heating device 14 if, after waiting for the second interval B of time, the variation speed dΔP/dt of the pressure difference ΔP between upstream and downstream of the air filter 9 became negative for at least a given period of time (or the pressure difference ΔP between upstream and downstream of the air filter 9 decreased for at least a given period of time).

According to a preferred (but non-limiting) embodiment, the control unit 15 reduces the power of the heating device 14 pursuing a negative variation speed dΔP/dt of the pressure difference ΔP between upstream and downstream of the air filter 9 (or a decrease in the pressure difference ΔP between upstream and downstream of the air filter 9). For example, the control unit 15 reduces the power of the heating device 14 by a first quantity when the variation speed dΔP/dt of the pressure difference ΔP between upstream and downstream of the air filter 9 is negative and thus subsequently increases the power of the heating device 14 by a second quantity equal to half of the first quantity when the variation speed dΔP/dt of the pressure difference ΔP between upstream and downstream of the air filter 9 became positive after a previous reduction in the power of the heating device 14.

According to a preferred embodiment, the control unit 15 cyclically determines the temperature T of the air filter 9 (in particular, the temperature T of the panel 11 of filtering material of the air filter 9) through the reading of the temperature sensor 17. Furthermore, the control unit 15 turns off the heating device 14 if the temperature T of the air filter 9 is greater than a predetermined threshold value TV3 (for example, 15° C.). This kind of control serves a dual purpose: both to avoid wasting electricity unnecessarily through the heating device 14, and to avoid overheating the air filter 9 (the panel 11 of filtering material deteriorates if it reaches temperatures in excess of 75-80° C.). The control unit 15 controls the temperature T of the air filter 9 to have the chance to rectify in the case of errors in the control based on the variation speed dΔP/dt of the pressure difference ΔP between upstream and downstream of the air filter 9; in other words, the control of the temperature T of the air filter 9 is superfluous (or rather, not strictly necessary) and serves to avoid problems in the case of errors in the control based on the variation speed dΔP/dt of the pressure difference ΔP between upstream and downstream of the air filter 9.

According to a preferred embodiment, the control unit 15 opens the shutter device 19 of the bypass air intake 18 arranged downstream of the air filter 9 when the variation speed dΔP/dt of the pressure difference ΔP between upstream and downstream of the air filter 9 is positive, and in absolute value greater than a threshold value TV2 (largely greater than the threshold value TV1, for example, equal to four/five times the threshold value TV1); to avoid reacting to sporadic reading errors of the pressure sensor 16, the control unit 15 preferably opens the shutter device 19 of the bypass air intake 18 arranged downstream of the air filter 9 when the variation speed dΔP/dt of the pressure difference ΔP between upstream and downstream of the air filter 9 is positive, and in absolute value permanently greater than the threshold value TV2 for an interval C of time.

According to a preferred embodiment, the control unit 15 opens the shutter device 19 of the bypass air intake 18 arranged downstream of the air filter 9 when the pressure difference ΔP between upstream and downstream of the air filter 9 is greater than a threshold value ΔPc; to avoid reacting to sporadic reading errors of the pressure sensor 16, the control unit 15 preferably opens the shutter device 19 of the bypass air intake 18 arranged downstream of the air filter 9 when the pressure difference ΔP between upstream and downstream of the air filter 9 is constantly greater than the threshold value ΔPc for an interval D of time.

Preferably, the control unit 15 opens the shutter device 19 of the bypass air intake 18 arranged downstream of the air filter 9 both when the variation speed dΔP/dt of the pressure difference ΔP between upstream and downstream of the air filter 9 is greater than the threshold value TV2 and when the pressure difference ΔP between upstream and downstream of the air filter 9 is greater than the threshold value ΔPc. The opening of the shutter device 19 when the variation speed dΔP/dt of the pressure difference ΔP between upstream and downstream of the air filter 9 is greater than the threshold value TV2 allows the shutter device 19 to be opened in an anticipated manner (or in a "proactive" manner) when the growth of the pressure difference ΔP between upstream and downstream of the air filter 9 is so fast as to bring the pressure difference ΔP between upstream and downstream of the air filter 9 quickly to be too high (or potentially dangerous for the correct working of the engine 2). Instead, the opening of the shutter device 19 when the pressure difference ΔP between upstream and downstream of the air filter 9 is greater than the threshold value ΔPc allows the shutter device 19 to be opened when the pressure difference ΔP between upstream and downstream of the air filter 9 is so high as to be potentially dangerous for the correct working of the engine 2 (because it prevents the entry of a flow of fresh air, which is sufficient for generating a suitable mechanical power).

Figure 3:
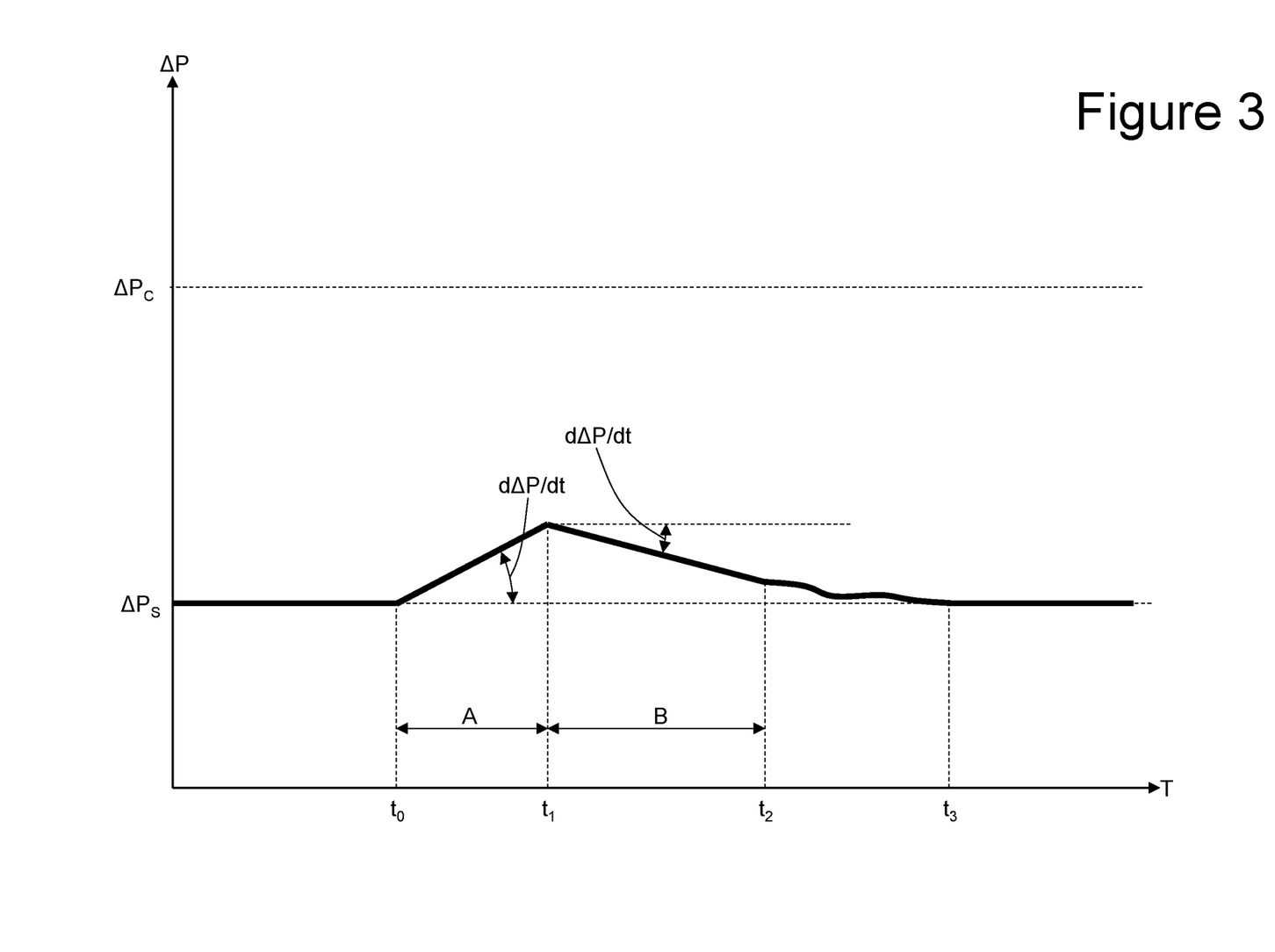
FIGS. 3, 4 and 5 are three diagrams, illustrating the time course of the difference in pressure between upstream and downstream of an air filter of the intake system in FIG. 2 in three different situations.

According to the illustration in FIG. 3, until the instant to the pressure difference ΔP between upstream and downstream of the air filter 9 is equal to a standard value ΔPs (or typical of the air filter 9 in full efficiency); starting from instant to ice starts to form on the outer surface of the air filter 9 and so the pressure difference ΔP between upstream and downstream of the air filter 9 starts to grow with a variation speed dΔP/dt greater than the threshold value TV1. At the instant $t_1$ (or after the interval A of time has passed from the instant to), the control unit 15 turns on the heating device 14 because the variation speed dΔP/dt of the pressure difference ΔP between upstream and downstream of the air filter 9 remained positive, and in absolute value continually greater than the threshold value TV1 for the interval A of time. After turning on the heating device 14, the ice, which has formed on the outer surface of the air filter 9, starts to melt and thus the pressure difference ΔP between upstream and downstream of the air filter 9 begins to decrease. At the instant $t_2$ (or after the interval B of time has passed from the instant $t_1$, that is from the turning on of the heating device 14), the control unit 15 verifies that the variation speed dΔP/dt of the pressure difference ΔP between upstream and downstream of the air filter 9 has actually become negative for at least a given period of time and thus keeps the heating device 14 on, at the same time trying to reduce the power of the heating device 14 pursuing a negative variation speed dΔP/dt of the pressure difference ΔP between upstream and downstream of the air filter 9 (or a decrease in the pressure difference ΔP between upstream and downstream of the air filter 9). As a result of the action of the heating device 14, all of the ice present on the outer surface of the air filter 9 is melted and thus at the instant $t_3$ the pressure difference ΔP between upstream and downstream of the air filter 9 returns to the standard value ΔPs (or typical of the air filter 9 at maximum efficiency).

Figure 4:
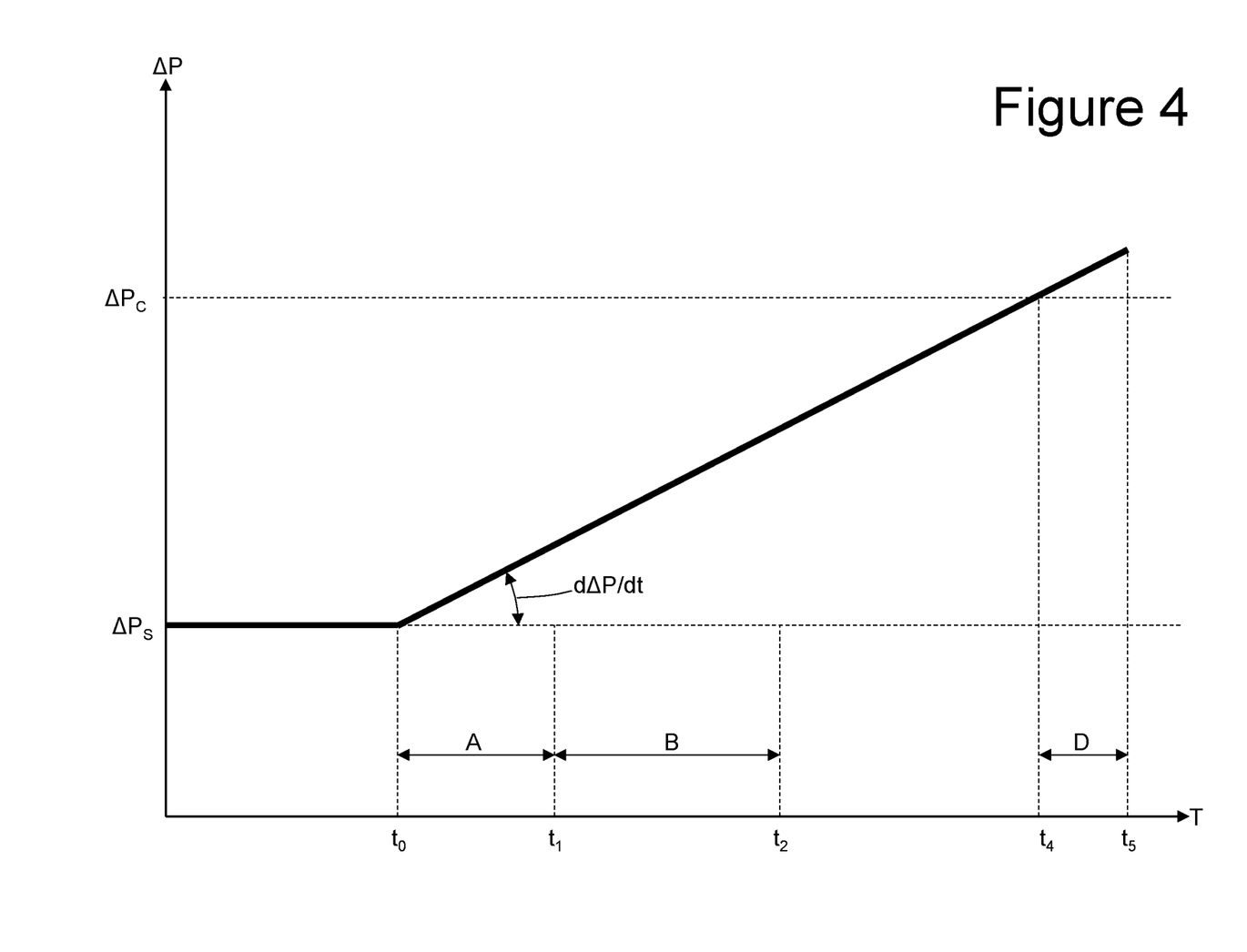

According to the illustration in FIG. 4, until the instant to, the pressure difference ΔP between upstream and downstream of the air filter 9 is equal to a standard value ΔPs (or typical of the air filter 9 at maximum efficiency); starting from the instant to, the air filter 9 is clogged by debris (non-aqueous debris and thus insensitive to temperature variations) and consequently the pressure difference ΔP between upstream and downstream of the air filter 9 starts to grow with a variation speed dΔP/dt greater than the threshold value TV1. At the instant $t_1$ (or after the interval A of time has passed from the instant to), the control unit 15 turns on the heating device 14 because the variation speed dΔP/dt of the pressure difference ΔP between upstream and downstream of the air filter 9 stayed positive, and in absolute value continually greater than the threshold value TV1 for the interval A of time. The turning on of the heating device 14 has no effect on the debris, which is accumulating on the air filter 9 and so the pressure difference ΔP between upstream and downstream of the air filter 9 continues to grow also after turning on the heating device 14. At the instant $t_2$ (or after the interval B of time has passed from the instant $t_1$, that is after turning on the heating device 14), the control unit 15 verifies that the variation speed dΔP/dt of the pressure difference ΔP between upstream and downstream of the air filter 9 has never become negative and then turns off the heating device 14. At the instant $t_4$, the pressure difference ΔP between upstream and downstream of the air filter 9 exceeds the threshold value ΔPc and at the instant $t_5$ (or after the interval D of time has passed) the control unit 15 opens the shutter device 19 of the bypass air intake 18 arranged downstream of the air filter 9 because the pressure difference ΔP between upstream and downstream of the air filter 9 has been continually greater than the threshold value ΔPc for the interval D of time.

Figure 5:
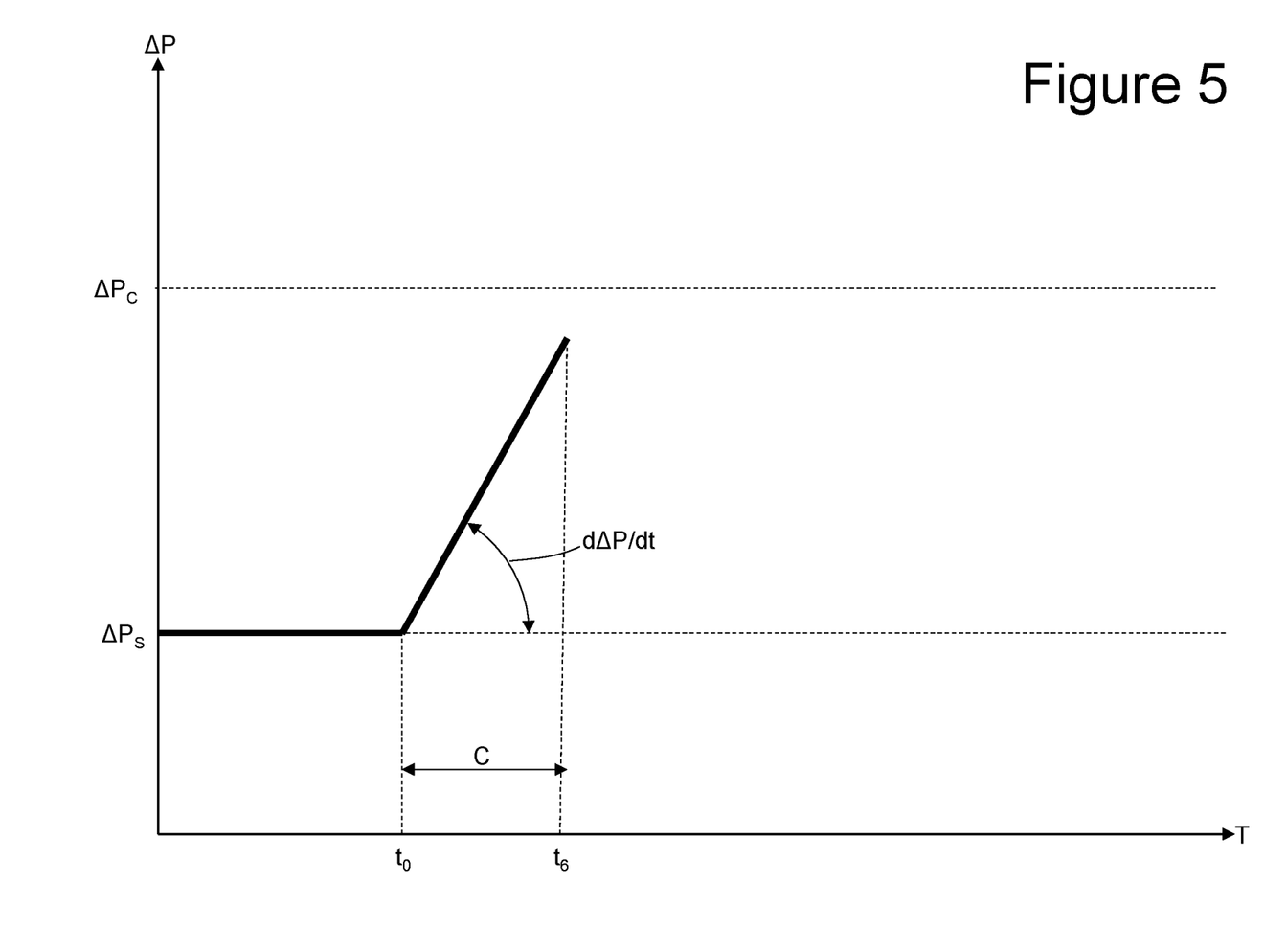

According to the illustration in FIG. 5, until the instant to, the pressure difference ΔP between upstream and downstream of the air filter 9 is equal to a standard value ΔPs (or typical of the air filter 9 at maximum efficiency); starting from the instant to, the air filter 9 is clogged by debris (non-aqueous debris and thus insensitive to temperature variations) and consequently the pressure difference ΔP between upstream and downstream of the air filter 9 starts to grow with a variation speed dΔP/dt greater than the threshold value TV2. At the instant $t_6$ (or after the interval C of time has passed from the instant $t_0$), the control unit 15 opens the shutter device 19 of the bypass air intake 18 arranged downstream of the air filter 9 because the variation speed dΔP/dt of the pressure difference ΔP between upstream and downstream of the air filter 9 was continually greater than the threshold value TV2 for the interval C of time.

The interval C of time can be longer than the interval A of time (in which case before opening the shutter device 19 of the bypass air intake 18 arranged downstream of the air filter 9 the control unit 15 nonetheless turns on the heating device 14 when the variation speed dΔP/dt of the pressure difference ΔP between upstream and downstream of the air filter 9 is continually greater than the threshold value TV2); alternatively, the interval C of time can be shorter than the interval A of time (in which case before opening the shutter device 19 of the bypass air intake 18 arranged downstream of the air filter 9 the control unit 15 does not turn on the heating device 14 when the variation speed dΔP/dt of the pressure difference ΔP between upstream and downstream of the air filter 9 is continually greater than the threshold value TV2).

The control method described above is based on the fact that the ice present on the outer surface of the air filter 9 is sensitive to the action of the heating device 14, so in the case of ice present on the outer surface of the air filter 9 the action of the heating device 14 is resolving. On the contrary, other types of debris different from ice (dust, leaves . . . ) are not sensitive to the action of the heating device 14, so in the case of debris different from ice present on the outer surface of the air filter 9 the action of the heating device 14 is inconsequential.

The embodiment shown by way of example in the illustrated figures relates to a helicopter 1, but the present invention can find advantageous use in any type of aircraft or other vehicle, also a road vehicle, provided with an engine, which for the working thereof must take in air from the outside environment (for example an off-road or all terrain vehicle, which must operate in particularly cold regions).

The embodiments described herein can be combined with one another without departing from the protective scope of the present invention.

The above described control method offers numerous advantages.

Firstly, the above described control method allows the heating device 14 of the air filter 9 to be controlled efficiently, or it allows the heating device 14 to be turned on when necessary to prevent the formation of a significant layer of ice on the outer surface of the air filter 9.

Furthermore, the control method described above allows the heating device 14 of the air filter 9 to be controlled efficiently, or it allows the heating device 14 to be turned on only when necessary, thus preventing the heating device 14 from being turned on when it is not necessary (in this way, the heating device 14 does not consume electricity unnecessarily).

Finally, the control method described above is robust (that is, it is capable of behaving in a "reasonable" manner in unforeseen circumstances) and it is easy and cheap to implement because it requires neither high computing power nor heavy memory usage for the realization thereof.

LIST OF REFERENCE NUMBERS OF THE FIGURES 1 helicopter
2 engine
3 tubular housing of 2
4 air intake
5 outlet opening of 3
6 metal grid
7 air box
8 intake system
9 air filter
10 perimeter frame of 9
11 panel of filtering material of 9
12 outer reinforcing net
13 inner reinforcing net
14 heating device
15 control unit
16 pressure sensor
17 temperature sensor
18 bypass air intake
19 shutter device
20 actuator

The invention claimed is:

1. A control method for controlling an air intake system (8) which supplies air to an engine (2) of a vehicle (1); the intake system (8) comprises a main air intake (4) coupled to an air filter (9), which is provided with a heating device (14); the control method comprises the steps of;
   determining a pressure difference (ΔP) between upstream and downstream of the air filter (9);
   determining first values of a variation speed (dΔP/dt) of the pressure difference (ΔP) between an upstream and a downstream of the air filter (9) are positive and in absolute value greater than a first threshold value (TV1) continuously for a first interval of time (A);
   in response to determining the first values of the variation speed (dΔP/dt) of the pressure difference (ΔP) between the upstream and the downstream of the air filter (9) are positive, and in absolute value greater than the first threshold value (TV1) continuously for the first interval of time (A), turning on the heating device (14);
   after turning on the heating device, determining a second value of the variation speed (dΔP/dt) of the pressure difference (ΔP) between the upstream and the downstream of the air filter (9) is not negative or determining the second value is not less than the first values; and
   in response to determining the second value of the variation speed (dΔP/dt) of the pressure difference (ΔP) between the upstream and the downstream of the air filter (9) is not negative or determining the second value is not less than the first values, turning off the heating device.

2. The control method according to claim 1, wherein the first values or the second value of the variation speed (dΔP/dt) of the pressure difference (ΔP) between the upstream and the downstream of the air filter (9) is determined by applying a low-pass filter to the first derivative in time of the pressure difference (ΔP) between the upstream and the downstream of the air filter (9).

3. The control method according to claim 1, wherein the heating device (14) is turned on at a greatest power possible when the first values of the variation speed (dΔP/dt) of the pressure difference (ΔP) between the upstream and the downstream of the air filter (9) are positive, and in absolute value greater than the first threshold value (TV1).

4. The control method according to claim 1 and comprising the further steps of:
waiting for a second interval of time (B) after turning on the heating device (14); and
and opening a shutter device (19) of a bypass air intake (18), which is arranged downstream of the air filter (9) and through which air is taken in as an alternative to the main air intake (4) and without going through the air filter (9), if, after waiting for the second interval of time (B), third values the variation speed (dΔP/dt) of the pressure difference (ΔP) between the upstream and the downstream of the air filter (9) are not negative for at least a given amount of time.

5. The control method according to claim 1 and comprising the further steps of:
waiting for a second interval of time (B) after turning on the heating device (14); and
reducing a power of the heating device (14) if, after waiting for the second interval of time (B), third values of the variation speed (dΔP/dt) of the pressure difference (ΔP) between the upstream and the downstream of the air filter (9) are negative for at least a given amount of time.

6. The control method according to claim 5, wherein the power of the heating device (14) is reduced after determining a negative value for the variation speed (dΔP/dt) of the pressure difference (ΔP) between the upstream and the downstream of the air filter (9).

7. The control method according to claim 5 and comprising the further steps of:
reducing the power of the heating device (14) by a first quantity after determining the third values of the variation speed (dΔP/dt) of the pressure difference, (ΔP) between the upstream and the downstream of the air filter (9) are negative; and
increasing the power of the heating device (14) by a second quantity, which is equal to half the first quantity, after determining a fourth value of the variation speed (dΔP/dt) of the pressure difference (ΔP) between the upstream and the downstream of the air filter (9) is positive following a previous reduction in the power of the heating device (14).

8. The control method according to claim 1, wherein the heating device (14) is kept off as long as a shutter device (19) of a bypass air intake (18) arranged downstream of the air filter (9) is open.

9. The control method according to claim 1 and comprising the further step of opening a shutter device (19) of a bypass air intake (18) arranged downstream of the air filter (9) when third values of the variation speed (dΔP/dt) of the pressure difference (ΔP) between the upstream and the downstream of the air filter (9) are positive, and in absolute value greater than a second threshold value (TV2) greater than the first threshold value (TV1).

10. The control method according to claim 9, wherein the shutter device (19) is opened when the third values of the variation speed (dΔP/dt) of the pressure difference (ΔP) between the upstream and the downstream of the air filter (9) are positive, and in absolute value greater than the second threshold value (TV2) for a third interval of time (C).

11. The control method according to claim 1 and comprising the further step of opening a shutter device (19) of a bypass air intake (18) arranged downstream of the air filter (9) after determining a value of the pressure difference (ΔP) between the upstream and the downstream of the air filter (9) is greater than a third threshold value (ΔPc).

12. The control method according to claim 11, wherein the shutter device (19) is opened after determining values of the pressure difference (ΔP) between the upstream and the downstream of the air filter (9) are greater than the third threshold value (ΔPc) for a fourth interval of time (D).

13. The control method according to claim 1 and comprising the further steps of: determining a value of a temperature (T) of the air filter (9); and turning off the heating device (14) if the value of the temperature (T) of the air filter (9) is greater than a fourth predetermined threshold value (TV3).

14. A control method for controlling an air intake system (8) which supplies air to an engine (2) of a vehicle (1); the intake system (8) comprises a main air intake (4) coupled to an air filter (9), which is provided with a heating device (14); the control method comprises the steps of:
determining a pressure difference (ΔP) between an upstream and a downstream of the air filter (9);
determining first values of a variation speed (dΔP/dt) of the pressure difference (ΔP) between the upstream and the downstream of the air filter (9) are positive and in absolute value greater than a first threshold value (TV1) continuously for a first interval of time (A);
in response to determining the first values of the variation speed (dΔP/dt) of the pressure difference, (ΔP) between upstream and downstream of the air filter (9) are positive, and in absolute value greater than the first threshold value (TV1) continuously for the first interval of time (A), turning on the heating device (14);
waiting for a second interval of time (B) after turning on the heating device (14);
after waiting the second interval of time, determining second values of the variation speed (dΔP/dt) of the pressure difference (ΔP) between the upstream and the downstream of the air filter (9) are positive for at least a given amount of time,
in response to determining the second values of the variation speed (dΔP/dt) of the pressure difference (ΔP) between the upstream and the downstream of the air filter (9) are positive for at least the given amount of time, turning off the heating device (14) and opening a shutter device (19) of a bypass air intake (18), which is arranged downstream of the air filter (9) and through which air is taken in as an alternative to the main air intake (4) and without going through the air filter (9).

15. A control method for controlling an air intake system (8) which supplies air to an engine (2) of a vehicle (1); the intake system (8) comprises a main air intake (4) coupled to an air filter (9), which is provided with a heating device (14); the control method comprises the steps of:
determining a pressure difference (AΔP) between upstream and downstream of the air filter (9);

determining first values of a variation speed (dΔP/dt) of the pressure difference (ΔP) between an upstream and a downstream of the air filter (9) is positive and in absolute value greater than a first threshold value (TV1) continuously for a first interval of time (A);

in response to determining the first values of the variation speed (dΔP/dt) of the pressure difference (ΔP) between the upstream and the downstream of the air filter (9) are positive, and in absolute value greater than the first threshold value (TV1) continuously for the first interval of time (A), turning on the heating device (14);

waiting for a second interval of time (B) after turning on the heating device (14); and reducing the power of the heating device (14) if, after waiting for the second interval of time (B), second values of the variation speed (dΔP/dt) of the pressure difference (ΔP) between the upstream and the downstream of the air filter (9) are negative for at least a given amount of time; and after turning on the heating device, determining a third value of the variation speed (dΔP/dt) of the pressure difference (ΔP) between the upstream and the downstream of the air filter (9) is not negative or determining the third value is not less than the first values; and in response to determining the third value of the variation speed (dΔP/dt) of the pressure difference (ΔP) between the upstream and the downstream of the air filter (9) is not negative or determining the third value is not less than the first values, turning off the heating device.

16. The control method according to claim 15, wherein the power of the heating device (14) is reduced after determining a negative value of the variation speed (dΔP/dt) of the pressure difference (ΔP) between the upstream and the downstream of the air filter (9).

17. The control method according to claim 15 and comprising the further steps of:

reducing the power of the heating device (14) by a first quantity when the second values of the variation speed (dΔP/dt) of the pressure difference (ΔP) between the upstream and the downstream of the air filter (9) is negative; and increasing the power of the heating device (14) by a second quantity, which is equal to half the first quantity, when a fourth value of the variation speed (dΔP/dt) of the pressure difference (ΔP) between the upstream and the downstream of the air filter (9) is positive following a previous reduction in the power of the heating device (14).

18. A control method for controlling an air intake system (8) which supplies air to an engine (2) of a vehicle (1); the intake system (8) comprises a main air intake (4) coupled to an air filter (9), which is provided with a heating device (14); the control method comprises the steps of:

determining a pressure difference (ΔP) between upstream and downstream of the air filter (9);

determining first values of a variation speed (dΔP/dt) of the pressure difference (ΔP) between the upstream and the downstream of the air filter (9) is positive and in absolute value greater than a first threshold value (TV1) continuously for a first interval of time (A);

in response to determining the first values of the variation speed (dΔP/dt) of the pressure difference (ΔP) between upstream and downstream of the air filter (9) are positive, and in absolute value greater than the first threshold value (TV1) continuously for the first interval of time (A) turning on the heating device (14);

determining a second value of the variation speed (dΔP/dt) of the pressure difference (ΔP) between the upstream and the downstream of the air filter (9) is positive, and in absolute value greater than a second threshold value (TV2) greater than the first threshold value (TV1);

in response to determining the second value of the variation speed (dΔP/dt) of the pressure difference (ΔP) between the upstream and the downstream of the air filter (9) is positive, and in absolute value greater than a second threshold value, (TV2) greater than the first threshold value (TV1), opening a shutter device (19) of the bypass air intake (18) arranged downstream of the air filter (9) and turning off the heating device.

19. The control method according to claim 18, wherein the shutter device (19) is opened when third values of the variation speed (dΔP/dt) of the pressure difference (ΔP) between the upstream and the downstream of the air filter (9) are positive, and in absolute value greater than the second threshold value (TV2) for a third interval of time (C).

* * * * *